United States Patent Office 3,541,059
Patented Nov. 17, 1970

3,541,059
NOVEL REACTION PRODUCTS OF GLYCIDYL ESTERS AND ALKALI METAL SULFITE OR BISULFITE, AND POLYMERS THEREOF
Raymond J. Schaper, Pittsburgh, Pa., assignor, by mesne assignments, to Calgon Corporation, a corporation of Delaware
No Drawing. Filed Apr. 19, 1967, Ser. No. 631,875
Int. Cl. C08f 7/12, 19/00
U.S. Cl. 260—79.3
8 Claims

ABSTRACT OF THE DISCLOSURE

The monomers 2-hydroxy-3-methyacryloyloxy propyl sulfonic acid, typically the sodium salt, and 2-hydroxy-3-acryloyloxy propyl sulfonic acid, sodium salt, and their preparation, are disclosed. The new monomers are homopolymerizable and copolymerizable with other water-soluble monomers of anionic or nonionic nature.

BACKGROUND OF THE INVENTION

This invention relates to the polymerizable reaction products of glycidyl esters and salts of sulfurous acid, polymerizable monomer and polymers derived therefrom.

The compounds provided for by the present invention may be represented by the general formula:

$$CH_2=\overset{R_1}{\underset{\underset{O}{\|}}{C}}-C-O-CH_2-\overset{H}{\underset{OH}{C}}-CH_2-SO_3^{\ominus} M^{\oplus}$$

where $R_1$ is selected from the class consisting of hydrogen and methyl and M is a monovalent alkali metal or ammonium cation.

Sulfonated monomers have long been sought after because of the utility of employing their polymers for the separation of alumina slurries, filtration of activated and digested sewage, the inhibition of scale formations in water systems, and any application where a strongly anionic polymer is required.

However, the art has not hitherto disclosed the compounds of the present invention, which contain both hydroxyl and sulfonic acid groups. Due to the presence of the hydroxyl group as well as the sulfonic acid groups, my new monomer is highly soluble in water, thereby lending itself to economical polymer manufacture.

The addition of a sulfite or bisulfite to an epoxy compound is not a new reaction of organic chemistry, but was elucidated recently in the paper of Remsen Ten Eyck Schenck and Samuel Kaizerman (JACS 75, 1636–41, 1953, The Reaction of Bisulfite with Epoxy Compounds). British Pat. 983,045 discusses the preparation of similar compounds but not of unsaturated esters of acids.

SUMMARY OF THE INVENTION

My invention contemplates the reaction product of a glycidyl acrylic or methacrylic ester and the sulfite or bisulfite alkali metal and ammonium salts represented schematically by the following equations:

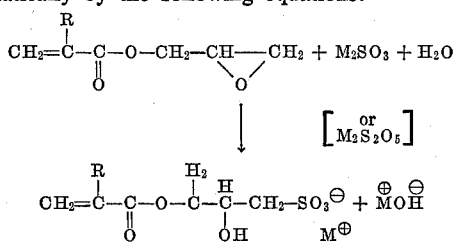

where R is H or CH₃ and M is alkali metal or ammonium.

The monomers of this invention can be best prepared in a polar solvent, such as water, methanol, ethanol, dimethyl formamide, etc., but the reaction is best carried out in aqueous solution, since water is also one of the reactants in the formation of the products.

The addition of glycidyl acrylic and methacrylic esters to aqueous sulfite or bisulfite solution can be carried out in the temperature range of 0° to 100° C., but the preferred temperature range is between 10° C. and 50° C. Since the addition of glycidyl acrylic and methacrylic esters to aqueous sulfite and bisulfite is exothermic, personal safety dictates the removal of the heat of reaction by a suitable means.

The monomers of my invention might also be prepared by the following illustrative method:

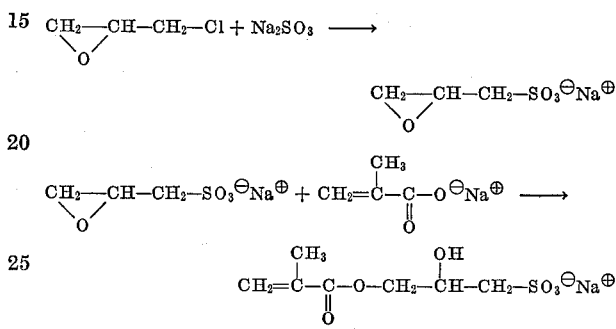

Since my new monomers have a great affinity for water, for preferably homopolymerized in aqueous systems. However, they may also be polymerized in other polar solvents in which they are soluble, such as methanol, ethanol, dimethylformamide, etc. Suitable polymerization catalysts are benzoyl peroxide, tert butyl hydroperoxide, azobisisobutyronitrile, ammonium persulfate, etc. Polymerization temperatures may vary from 0° C. to 100° C., but the preferred ranges are 30° C. to 80° C.

The homopolymers of this invention are hydroscopic solids of the formula:

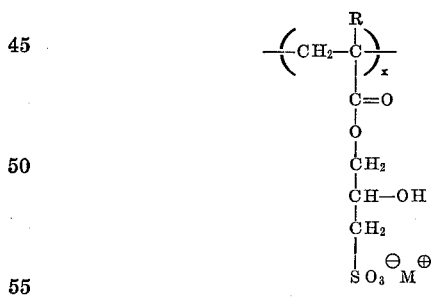

where R and M are defined as above.

These novel monomers may also be copolymerized with other water-soluble monomers, such as the alkali metal salts of acrylic and/or methacrylic acid, vinyl sulfonic acid, styrene sulfonate, acrylamide, methacrylamide, amino acrylic esters such as dimethylaminoethylmethacrylate, diethylaminoethyl acrylate, tert-butyl amino ethylmethacrylate, etc., and any other comonomer which is water soluble and either nonionic or anionic in nature.

The copolymers of my new monomers with acrylamide may be made in any ratio of acrylamide to new monomers, but for the purpose of solids-liquid separation I prefer polymers in which acrylamide comprises about 50% to about 90% by weight.

The preferred procedure for preparing the monomers, polymers and copolymers of this invention is further illustrated by the following examples:

EXAMPLE I

Preparation of 2-hydroxy-3-methacryloyloxy propyl sulfonic acid, sodium salt $$CH_2=\underset{\underset{O}{\|}}{\overset{CH_3}{\underset{|}{C}}}-C-O-CH_2-\underset{\diagdown O \diagup}{CH-\!\!-\!\!-CH_2} + Na_2SO_3$$

$$\downarrow$$

$$CH_2=\underset{\underset{O}{\|}}{\overset{CH_3}{\underset{|}{C}}}-C-O-CH_2-\underset{\underset{OH}{|}}{CH}-CH_2-S^{\ominus}Na^{\oplus}$$

A solution of sodium sulfite was prepared by adding 422 grams of sodium sulfite reagent grade, to 1688 grams of water.

To this solution was added 426 grams of glycidyl methacrylate, over a period of 2½ hours. The temperature was maintained at 25 to 30° C. during the addition.

The reaction mixture was stirred for an additional 3 hour period, during which it became homogeneous.

The solid monomer, 2-hydroxy-3-methacryloyloxy propyl sulfonic acid, sodium salt was isolated by adding 400 ml. of methanol to a 25 ml. portion of the above monomer solution, followed by 500 ml. of ether. The resulting monomer was a white solid, which had no observable melting point. Infrared spectra showed a strong band at approximately 1200 cm.$^{-1}$, indicative of the sulfonic acid group, and a strong band at 1600 cm.$^{-1}$, indicative of unsaturation.

EXAMPLE II

Homopolymers of 2-hydroxy-3-methacryloyloxy propyl sulfonic acid, sodium salt

The monomer prepared in Example I (50 g. 0.203 moles) was dissolved in water (116.7 g.). To this solution was added ethylene diamine tetracetic acid, tetrasodium salt, (0.0144 g.), sodium salicylate, (0.144 g.), and nitriotris propionamide (0.0729 g.). The pH of the solution was adjusted to 6.5, and the solution purged with N$_2$, for 1 hour at 50° C.

After the purge, ammonium persulfate (0.0347 g.) was added, and five minutes later a solution of 0.362 g. of sodium metabisulfite and 0.0283 g. of copper sulfate pentahydrate, diluted to a liter, was pumped in at 0.1 ml. per minute, for 100 minutes.

The reaction mixture exothermed to 54° C. from an initial 50° C. and the solution got viscous. The solid polymer was precipitated from solution by addition of methanol; and had an intrinsic viscosity of 0.222 deciliters/gram in 1 N NaCl at 30° C.

EXAMPLE III

Preparation of 2-hydroxy-3-methacryloyloxy propyl sulfonic acid, sodium salt

To a solution of 339 grams of sodium sulfite in 900 grams of water was added 348 grams of glycidyl methacrylate over a 2-hour period. During the addition the reaction mixture exothermed from 31.0° C. to 82.4° C. The reaction mixture was held at 70 to 80° C. for 2 additional hours during which the reaction mixture became homogeneous.

EXAMPLE IV

Homopolymers of 2-hydroxy-3-methacryloyloxy propyl sulfonic acid, sodium salt

The resulting solution of Example III was purged with N$_2$ at 80° C. for 1 hour at a pH value of 10. After the purge, a solution of ammonium persulfate (37 g. 100 ml.) was metered in at 0.1 ml./minute for 4 hours, during which the temperature rose from 80° C. to 101° C.

The solid polymer was precipitated from solution by addition of methanol, and had an intrinsic viscosity of 0.225 g. deciliters/gram in 1 N NaCl at 30° C.

EXAMPLE V

Copolymer of acrylamide and 2-hydroxy-3-methacryloyloxy propyl sulfonic acid, sodium salt The monomer solution was prepared by adding acrylamide (25 g.) and 2-hydroxy-3-methacryloyloxy-propyl sulfonic acid, sodium salt (25 g.) to 116.7 g. of water. To this solution was added ethylenediamine tetra acetic acid, tetra sodium salt, (0.032 g.), sodium salicylate, (0.323 g.) and nitrilotris propionamide, (0.163 g.). The pH of the solution was adjusted to 6.5 and the solution purged with N$_2$ for 1 hour at 50° C.

After the purge, ammonium persulfate (0.0777 g.) was added, and six minutes later, a solution of 0.809 g. sodium metabisulfite and 0.063 g. of copper sulfate pentahydrate, diluted to one liter was pumped into the monomer solution at 0.1 ml. per minute.

The reaction mixture exothermed from 52° C. to 74° C. in 100 minutes, and was extremely viscous. The resulting copolymer was precipitated from solution by the addition of methanol.

EXAMPLE VI

Preparation of 2-hydroxy-3-acryloyloxy propyl sulfonic acid, sodium salt $$CH_2\!=\!CH-\underset{\underset{O}{\|}}{C}-O-CH_2-\underset{\diagdown O \diagup}{CH-\!\!-\!\!-CH_2} + Na_2SO_3$$

$$\downarrow$$

$$CH_2=CH-\underset{\underset{O}{\|}}{C}-O-CH_2-\underset{\underset{OH}{|}}{CH}-CH_2-SO_3^{\ominus}Na^{\oplus}$$

A solution of sodium sulfite was prepared by adding 422 grams of sodium sulfite, reagent grade, to 1688 grams of water.

To this solution was added 374 grams of glycidyl acrylate, over a period of 2 hours. The temperature rose from 27 to 36.8° C. during the addition.

The reaction mixture was heated to 70° C. and held at this temperature for an additional 3-hour period, during which it became homogeneous.

The solid monomer, 2-hydroxy-3-acryloyloxy propyl sulfonic acid, sodium salt, was isolated by adding 400 ml. of methanol to a 25 ml. portion of the above monomer solution, followed by 500 ml. of ether. The resulting monomer was a white solid, which had no observable melting point. Infrared spectra showed a strong band at approximately 1200 cm.$^{-1}$, indicative of the sulfonic acid group, and a strong band at 1600 cm.$^{-1}$, indicative of unsaturation.

EXAMPLE VII

Homopolymers of 2-hydroxy-3-acryloyloxy propyl sulfonic acid, sodium salt

The monomer prepared in Example VI (50 g. 0.203 moles) was dissolved in water (116.7 g.). To this solution was added ethylene diamine tetracetic acid, tetrasodium salt, (0.0154 g.), sodium salicylate, (0.153 g.), and nitrilotris propionamide (0.0775 g.). The pH of the solution was adjusted to 6.5, and the solution purged with N$_2$, for 1 hour at 50° C.

After the purge, ammonium persulfate (0.0453 g.) was added, and five minutes later a solution of 0.472 g. of sodium metabisulfite and 0.037 g. of copper sulfate pentahydrate, diluted to a liter, was pumped in at 0.1 ml. per minute.

The reaction mixture exothermed to 62° C. from an initial 50° C. in 60 minutes and the solution became viscous. The solid polymer was precipitated from solution by addition of methanol; and had an intrinsic viscosity of 0.248 deciliters/gram in 1 N NaCl at 30° C.

EXAMPLE VIII

Copolymer of acrylamide and 2-hydroxy-3-acryloyloxy propyl sulfonic acid, sodium salt The monomer solution was prepared by adding acrylamide (25 g.) and 2-hydroxy-3-acryloyloxy propyl sulfonic acid, sodium salt (25 g.) to 116.7 g. of water. To this solution was added ethylenediamine tetra acetic acid, tetra sodium salt, (0.0327 g.), sodium salicylate, (0.326 g.) and nitrilotrispropionamide, (0.165 g.). The pH of the solution was adjusted to 6.5 and the solution purged with $N_2$ for 1 hour at 50° C.

After the purge, ammonium persulfate (0.0786 g.) was added, and one minute later, a solution of 0.819 g. of sodium metabisulfite and 0.0642 g. of copper sulfate pentahydrate, diluted to one liter, was pumped into the monomer solution at 0.1 ml. per minute.

The reaction mixture exothermed from 52° C. to 82.4° C. in 30 minutes, and was extremely viscous. The resulting copolymer was precipitated from solution by the addition of methanol.

I do not intend to be bound by the above specifically illustrated examples of my invention. It may be otherwise practiced within the scope of the following claims.

I claim:

1. Compound of the formula:

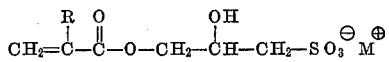

where R is selected from the group consisting of H and $CH_3$, and M is selected from the group consisting of alkali metal and ammonium.

2. Compound of claim 1 in which R is hydrogen and M is sodium.

3. Compound of claim 1 in which R is $CH_3$ and M is sodium.

4. Method of preparing a compound of claim 1 comprising reacting a glycidyl ester of the formula:

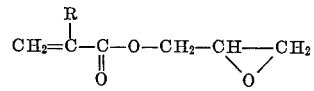

where R is selected from the group consisting of H and $CH_3$ with a sulfite of the formula $M_2SO_3$ where M is selected from the group consisting of alkali metal and ammonium, said reaction being accomplished by adding the glycidyl ester to a solution of the sulfite in a polar solvent and maintaining the temperature of the reaction between 0° and 100° C., preferably between 10° C. and 50° C.

5. Homopolymer of a compound of claim 1.

6. A random, linear, water-soluble copolymer of a compound of claim 1 and acrylamide.

7. A random, linear, water-soluble copolymer as in claim 6 in which the acrylamide comprises about 50% to about 90% by weight of the copolymer.

8. A random, linear, water-soluble copolymer of a compound of claim 1 and a water-soluble non-ionic or anionic comonomer.

References Cited

UNITED STATES PATENTS

| | | | |
|---|---|---|---|
| 2,601,256 | 6/1952 | Bruson | 260—79.3 |
| 2,676,166 | 4/1954 | Webers | 260—86.1 |
| 3,033,833 | 5/1962 | Le Fevre | 260—486 |

OTHER REFERENCES

Schenck et al., "Reaction of Bisulfite With Epoxy Compounds" JACS, vol. 75, pp. 1636–1641, 1953.

JAMES A. SEIDLECK, Primary Examiner

U.S. Cl. X.R.

210—54, 58; 260—29.6, 486

UNITED STATES PATENT OFFICE
CERTIFICATE OF CORRECTION

Patent No. 3,541,059      Dated November 17, 1970

Inventor(s) Raymond J. Schaper

It is certified that error appears in the above-identified patent and that said Letters Patent are hereby corrected as shown below:

Column 3, line 15 should appear as shown below:

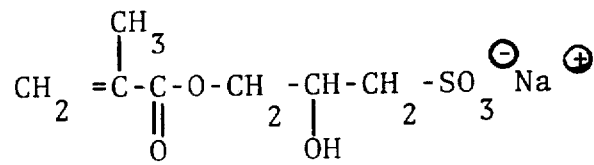

Signed and sealed this 13th day of April 1971.

(SEAL)
Attest:

EDWARD M. FLETCHER, JR.
Attesting Officer

WILLIAM E. SCHUYLER
Commissioner of Pat